(12) United States Patent
Van Phan et al.

(10) Patent No.: US 12,294,961 B2
(45) Date of Patent: May 6, 2025

(54) TIME SYNCHRONIZATION ENHANCEMENT FOR A GROUP OF UE

(71) Applicant: Nokia Technologies Oy, Espoo (FI)

(72) Inventors: Vinh Van Phan, Oulu (FI); Ling Yu, Kauniainen (FI); Zexian Li, Espoo (FI); Kari J. Niemela, Oulu (FI); Vladimir Vukadinovic, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/263,292

(22) PCT Filed: Aug. 7, 2019

(86) PCT No.: PCT/IB2019/056729
§ 371 (c)(1),
(2) Date: Jan. 26, 2021

(87) PCT Pub. No.: WO2020/031113
PCT Pub. Date: Feb. 13, 2020

(65) Prior Publication Data
US 2021/0219253 A1     Jul. 15, 2021

Related U.S. Application Data

(60) Provisional application No. 62/715,927, filed on Aug. 8, 2018.

(51) Int. Cl.
*H04W 56/00*     (2009.01)
*H04L 41/0893*   (2022.01)
(Continued)

(52) U.S. Cl.
CPC ....... *H04W 56/001* (2013.01); *H04L 41/0893* (2013.01); *H04L 41/0894* (2022.05);
(Continued)

(58) Field of Classification Search
CPC ............. H04W 56/001; H04W 56/004; H04W 56/0055; H04L 41/0893
See application file for complete search history.

(56) References Cited

U.S. PATENT DOCUMENTS

2012/0120821 A1*  5/2012  Kazmi ............. H04W 56/0045
                                                     370/336
2013/0044659 A1   2/2013  Jokimies et al.
(Continued)

FOREIGN PATENT DOCUMENTS

CN       105453668 A      3/2016
EP       2544387 A1       1/2013
(Continued)

OTHER PUBLICATIONS

"3rd Generation Partnership Project; Technical Specification Group Services and System Aspects; Study on Communication for Automation in Vertical Domains (Release 16)", 3GPP TR 22.804, V1.2.0, May 2018, pp. 1-191.
(Continued)

*Primary Examiner* — Derrick W Ferris
*Assistant Examiner* — M Mostazir Rahman
(74) *Attorney, Agent, or Firm* — Lippes Mathias LLP

(57) ABSTRACT

In accordance with example embodiments of the invention there is at least a method and apparatus to perform determining, by a network node, context information of a group of more than one user equipment, wherein the context information is based on at least service related information associated with the more than one user equipment; sending information comprising the context information towards at least one base station of a communication network; and based on the context information, negotiating with the at least one base station timing synchronization requirements for distribution to each user equipment of the group. Further, there is at least a method and an apparatus to perform (Continued)

receiving from a network node, by a network device of a communication network, information comprising context information associated with a group of more than one user equipment, wherein the context information is based on at least service related information associated with the more than one user equipment; based on the information, negotiating with the network node timing synchronization requirements for distribution to each user equipment of the group; and in response to the negotiating, selecting at least one network device of the communication network for the distribution by the at least one network device of the timing synchronization requirements to each user equipment of the group of more than one user equipment.

19 Claims, 6 Drawing Sheets

(51) Int. Cl.
  *H04L 41/0894* (2022.01)
  *H04L 41/0895* (2022.01)
(52) U.S. Cl.
  CPC ....... *H04L 41/0895* (2022.05); *H04W 56/004* (2013.01); *H04W 56/0055* (2013.01)

(56) References Cited

U.S. PATENT DOCUMENTS

| | | | | |
|---|---|---|---|---|
| 2013/0279482 | A1* | 10/2013 | Sundberg | H04W 56/0045 370/336 |
| 2013/0301619 | A1* | 11/2013 | Singh | H04W 56/0045 370/336 |
| 2015/0245255 | A1* | 8/2015 | Van Phan | H04W 36/0033 455/457 |
| 2016/0345281 | A1 | 11/2016 | Murray | |
| 2017/0055235 | A1 | 2/2017 | Rabii et al. | |
| 2017/0222743 | A1* | 8/2017 | Ruffini | H04J 3/0658 |
| 2017/0251418 | A1* | 8/2017 | Aweya | H04L 43/106 |
| 2018/0206208 | A1 | 7/2018 | Nguyen et al. | |
| 2019/0007919 | A1* | 1/2019 | Petrus | H04W 56/0015 |
| 2019/0053173 | A1* | 2/2019 | Thong | H04W 56/001 |
| 2019/0064873 | A1* | 2/2019 | Carlstedt | H04L 7/0079 |
| 2019/0180328 | A1* | 6/2019 | Gargaro | H04W 4/025 |
| 2020/0077352 | A1* | 3/2020 | Yu | H04W 56/0015 |

FOREIGN PATENT DOCUMENTS

| | | | |
|---|---|---|---|
| GB | 2483752 | A | 3/2012 |
| KR | 20030002950 | A | 1/2003 |
| WO | 2013/083197 | A1 | 6/2013 |
| WO | 2014/014734 | A1 | 1/2014 |
| WO | 2017/077758 | A1 | 5/2017 |
| WO | 2017/077864 | A1 | 5/2017 |
| WO | 2018/063086 | A1 | 4/2018 |
| WO | WO-2020009622 | A1 * | 1/2020 .......... H04W 56/001 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.18.0, Sep. 2017, pp. 1-364.

"Introduction of Time Reference Provision", 3GPP TSG-RAN WG2 #102, R2-1809233, Huawei, May 21-25, 2018, 49 pages.

"3rd Generation Partnership Project; Technical Specification Group Services and System Aspects; Study on Communication for Automation in Vertical Domains (Release 16)", 3GPP TR 22.804, V16.0.0, Jun. 2018, pp. 1-189.

International Search Report and Written Opinion received for corresponding Patent Cooperation Treaty Application No. PCT/IB2019/056729, dated Nov. 25, 2019, 13 pages.

Office action received for corresponding Indian Patent Application No. 202147007613, dated Jan. 18, 2022, 7 pages.

Notice of Allowance received for corresponding Chinese Patent Application No. 201980053723.9, dated May 31, 2024, 6 pages of Notice of Allowance and no page of translation available.

Discussion on D2D Group Communication, 3GPP TSG RAN WG1 Meeting #74, R1-133117, Agenda: 7.2.8.1, Samsung, Aug. 19-23, 2013, 5 pages.

Scenarios and Key Issues for the LTE Device to Device Discovery, 3GPP TSG RAN2 Meeting #83, R2-132349, Agenda: 7.5.1, ITRI, Aug. 19-23, 2013, pp. 1-5.

Uplink timing advance for geographically distributed antennas, 3GPP TSG RAN WG1 Meeting #66, R1-112057, Agenda: 6.7.3, Huawei, Aug. 22-26, 2011, 2 pages.

Office action received for corresponding European Patent Application No. 19779124.7, dated Aug. 6, 2024, 4 pages.

Office action received for corresponding Chinese Patent Application No. 201980053723.9, dated Jan. 8, 2024, 7 pages of office action and no page of translation available.

\* cited by examiner

| Application | # of sensors / actuators | Typical message size | Cycle time $T_{cycle}$ | Service area |
|---|---|---|---|---|
| Printing Machine | > 100 | 20 B | < 2 ms | 100 m x 100 m x 30 m |
| Machine Tool | ~ 20 | 50 B | < 0.5 ms | 15 m x 15 m x 3 m |
| Packaging Machine | ~ 50 | 40 B | < 1 ms | 10 m x 5 m x 3 m |

510: determining, by a network node, context information of a group of more than one user equipment, wherein the context information is based on at least service related information associated with the more than one user equipment 520: sending information comprising the context information towards at least one base station of a communication network;

530: based on the context information, negotiating with the at least one base station timing synchronization requirements for time information distribution to each user equipment of the group

FIG. 5A

550: receiving from a network node, by a network device of a communication network, information comprising context information associated with a group of more than one user equipment, wherein the context information is based on at least service related information associated with the more than one user equipment 560: based on the information, negotiating with the network node timing synchronization requirements for distribution to each user equipment of the group 570: in response to the negotiating, selecting at least one network device of the communication network for the distribution of time information to each user equipment of the group of more than one user equipment 575: configuring time information usage at least one user equipment of the group of more than one user equipment

FIG. 5B

TIME SYNCHRONIZATION ENHANCEMENT FOR A GROUP OF UE

RELATED APPLICATION

This application claims priority to PCT Application No. PCT/IB2019/056729, filed on Aug. 7, 2019, which claims priority to U.S. Application No. 62/715,927, filed on Aug. 8, 2018, each of which is incorporated herein by reference in its entirety.

TECHNICAL FIELD

The teachings in accordance with the exemplary embodiments of this invention relate generally to providing accurate clock synchronization to minimize the timing error across a group of UEs, more specifically, relate to at least providing accurate clock synchronization to minimize timing error across a group of UEs, supporting deterministic packet transfer services over radio communications, and facilitating accurate application-level clock synchronization.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BBU Baseband Unit
BS Base Station
CCUC Closest Common Upstream Clock
CU Centralized Unit
CN Core Network
DTE Data Terminal Equipment
DU Distributed Unit
IAC Industrial Automation and Control
MTIE Maximum Time Interval Error
P-T-P Point To Point
PRTC Primary Reference Time Clock
RRC Radio Resource Control
RU Radio Unit
SFN System Frame Number
SIB System Information Block
TA Timing Advance
TAG Timing Advance Group
TE Time Error
TSN Time Sensitive Network
UE User Equipment
URLLC Ultra Reliable and Low Latency Communication
UTC Coordinated Universal Time The radio access network (RAN) connection provided by 5G-and-beyond systems may be one part of the end-to-end communication path for deterministic packet transfer required by application such as industrial automation. Such applications can rely on a variety of wireline Fieldbus and Industrial Ethernet technologies, while it is expected that at a future Time-Sensitive Networking (TSN) will dominate the market. To reduce deployment and maintenance costs, increase reconfigurability, and support mobility on the factory floor, it would seem to be beneficial to connect as many as possible of the nodes wirelessly using e.g., 5G network.

Therefore, integration with TSN is one of the requirements for 5G-and-beyond systems to support industrial automation. Since accurate application-level clock synchronization is required by industrial automation applications relying on deterministic communication, it is desirable that 5G RAN provides an accurate clock synchronization to provide at least deterministic communication over the radio for a group of 5G-connected nodes belonging to the same industrial automation and control (IAC) system, also referred as IAC group.

Example embodiments of the invention as discussed herein address a problem of how to provide at least accurate clock synchronization to minimize communication timing error across a group of UEs.

SUMMARY

This section contains examples of possible implementations and is not meant to be limiting.

In one exemplary embodiment of the invention, there is a method comprising: determining, by a network node, context information of a group of more than one user equipment, wherein the context information is based on at least service related information associated with the more than one user equipment; sending information comprising the context information towards at least one base station of a communication network; and based on the context information, negotiating with the at least one base station timing synchronization requirements for time information distribution to each user equipment of the group.

A further exemplary embodiment is a method comprising the method of the previous paragraph, wherein the context information comprises user equipment identifiers, and timing synchronization requirements for each user equipment of the group, wherein the negotiating is using serving context information associated with the communication network comprising information of a radio resource control state, at least one serving base station, and timing advance information associated with each user equipment of the group, wherein the server context information associated with the communication network comprises a list of base stations providing service to each of the more than one user equipment, and timing synchronization requirements associated with each of the more than one user equipment of the group, wherein each base station of the list maintains cell-specific timing advance values for at least one user equipment of the group of more than one user equipment, wherein the negotiating is based on a synchronization performance offered by the communication network, wherein the determining the context information is based on at least performance indications received from each of the at least one base station, wherein the at least one base station comprises more than one base station selected to minimize timing errors, and/or wherein the network node is embodied in an industrial automation and control system server.

An additional exemplary embodiment includes a computer program, comprising code for performing the methods of the previous paragraphs, when the computer program is run on a processor. The computer program according to this paragraph, wherein the computer program is a computer program product comprising a computer-readable medium bearing computer program code embodied therein for use with a computer.

In another exemplary embodiment of the invention, there is an apparatus comprising: means for determining, by a network node, context information of a group of more than one user equipment, wherein the context information is based on at least service related information associated with the more than one user equipment; means for sending information comprising the context information towards at least one base station of a communication network; and means, based on the context information, for negotiating with the at least one base station timing synchronization requirements for time information distribution to each user equipment of the group.

Another further exemplary embodiment is an apparatus comprising the apparatus of the previous paragraph, wherein the context information comprises user equipment identifiers, and timing synchronization requirements for each user equipment of the group, wherein the negotiating is using serving context information associated with the communication network comprising information of a radio resource control state, at least one serving base station, and timing advance information associated with each user equipment of the group, wherein the server context information associated with the communication network comprises a list of base stations providing service to each of the more than one user equipment, and timing synchronization requirements associated with each of the more than one user equipment of the group, wherein each base station of the list maintains cell-specific timing advance values for at least one user equipment of the group of more than one user equipment, wherein the negotiating is based on a synchronization performance offered by the communication network, wherein the determining the context information is based on at least performance indications received from each of the at least one base station, wherein the at least one base station comprises more than one base station selected to minimize timing errors, and/or wherein the network node is embodied in an industrial automation and control system server.

In still another exemplary embodiment of the invention, there is an method comprising: receiving from a network node, by a network device of a communication network, information comprising context information associated with a group of more than one user equipment, wherein the context information is based on at least service related information associated with the more than one user equipment; based on the information, negotiating with the network node timing synchronization requirements for the distribution of time information to each user equipment of the group; in response to the negotiating, selecting at least one network device of the communication network for the distribution by the at least one network device of the timing synchronization requirements to each user equipment of the group of more than one user equipment; and configuring time information usage at least one user equipment of the group of more than one user equipment.

A further exemplary embodiment is a method comprising the method of the previous paragraph, wherein the network device comprises a serving base station, and wherein the at least one network device of the communication network is selected by the serving base station based on at least the context information, wherein the context information comprises user equipment identifiers, and timing synchronization requirements for each user equipment of the group, wherein the negotiating is using serving context information associated with the communication network comprising information of a radio resource control state, at least one serving base station, and timing advance information associated with each user equipment of the group, wherein the serving context information comprises a list of network devices providing service to each of the more than one user equipment, wherein the selecting the at least one network device is based on the list of network devices comprising at least one common network device for the group of more than one user equipment, wherein the selecting the at least one network device is based on the at least one network device sharing a common master clock or belonging to a same timing advance group, wherein the at least one network device uses error characteristics associated with its common master clock to determine a frequency of the time information distribution to meet synchronization requirements of the more than one user equipment, wherein the distribution of the time information to each user equipment of the group is performed using at least one of broadcast and unicast signalling, wherein the distribution of the timing synchronization requirements comprises information of a closest common upstream clock associated with each of the at least one base station, wherein the determining the context information is based on at least one of: negotiating synchronization requirements with the IAC service; and performance indications received from each of the at least one network device, wherein the negotiating is based on a synchronization performance offered by the communication network, wherein the distribution of the time information is performed on a time-frequency resource that minimizes a timing error for each user equipment of the group, wherein the configuration of time information usage causes at least one user equipment of the group of more than one user equipment to not apply a propagation delay compensation based on a timing advance average, wherein the configuration of time information usage causes: a first subset of at least one user equipment of the group of more than one user equipment to not apply a time compensation based on a timing advance average; and a second subset of at least one user equipment of the group of more than one user equipment to apply a time compensation based on a timing advance average, and/or wherein the at least one network device compensates for timing advance average differences to synchronize the timing between each user equipment of the group of more than one user equipment.

An additional exemplary embodiment includes a computer program, comprising code for performing the methods of the previous paragraphs, when the computer program is run on a processor. The computer program according to this paragraph, wherein the computer program is a computer program product comprising a computer-readable medium bearing computer program code embodied therein for use with a computer.

In yet another exemplary embodiment of the invention, there is an apparatus comprising: means for receiving from a network node, by a network device of a communication network, information comprising context information associated with a group of more than one user equipment, wherein the context information is based on at least service related information associated with the more than one user equipment; means, based on the information, for negotiating with the network node timing synchronization requirements for the distribution to each user equipment of the group; means, in response to the negotiating, for selecting at least one network device of the communication network for the distribution of the time information to each user equipment of the group of more than one user equipment; and configuring time information usage at least one user equipment of the group of more than one user equipment.

A further exemplary embodiment is an apparatus comprising the apparatus of the previous paragraph, wherein the network device comprises a serving base station, and wherein the at least one network device of the communication network is selected by the serving base station based on at least the context information, wherein the context information comprises user equipment identifiers, and timing synchronization requirements for each user equipment of the group, wherein the negotiating is using serving context information associated with the communication network comprising information of a radio resource control state, at least one serving base station, and timing advance information associated with each user equipment of the group, wherein the serving context information comprises a list of network devices providing service to each of the more than one user equipment, wherein the selecting the at least one network device is based on the list of network devices comprising at least one common network device for the group of more than one user equipment, wherein the selecting the at least one network device is based on the at least one network device sharing a common master clock or belonging to a same timing advance group, wherein the at least one network device uses error characteristics associated with its common master clock to determine a frequency of the time information distribution to meet synchronization requirements of the more than one user equipment, wherein the distribution of the time information to each user equipment of the group is performed using at least one of broadcast and unicast signalling, wherein the distribution of the time information comprises information of a closest common upstream clock associated with each of the at least one base station, wherein the determining the context information is based on at least one of: negotiating synchronization requirements with the IAC service; and performance indications received from each of the at least one network device, wherein the negotiating is based on a synchronization performance offered by the communication network, wherein the distribution of the time information is performed on a time-frequency resource that minimizes a timing error for each user equipment of the group, wherein the configuration of time information usage causes at least one user equipment of the group of more than one user equipment to not apply a propagation delay compensation based on a timing advance average, wherein the configuration of time information usage causes: a first subset of at least one user equipment of the group of more than one user equipment to not apply a time compensation based on a timing advance average; and a second subset of at least one user equipment of the group of more than one user equipment to apply a time compensation based on a timing advance average, and/or wherein the at least one network device compensates for timing advance average differences to synchronize the timing between each user equipment of the group of more than one user equipment.

In accordance with additional example embodiments of the invention there is a method, comprising: receiving from a network device, by a user equipment of a communication network, first information comprising configuration of time information (timeInfo) usage; receiving further information comprising time information associated with at least one network device of the communication network; and based on the configuration of the time information usage and time information from the communication network, deriving synchronized timing by the user equipment.

A further exemplary embodiment is a method comprising the method of the previous paragraph, wherein the at least one network device comprises more than one network device that share a common master clock with the user equipment, wherein the more than one network device belong to a same timing advance group, wherein the deriving comprises deriving the configuration of time information usage from the network device is to cause the user equipment to apply a propagation delay compensation, wherein the deriving comprises deriving synchronized timing is based on configuration of time information usage from the network device related to use the configured operation to derive the synchronized timing if the user equipment receives the time information from more than one network devices, wherein there is determining a time error associated with a difference between the derived synchronized timing and the timing of the network device of the communication network from which timing information was received; and wherein the time error is signaled based on the difference exceeding a configured threshold.

An additional exemplary embodiment includes a computer program, comprising code for performing the methods of the previous paragraphs, when the computer program is run on a processor. The computer program according to this paragraph, wherein the computer program is a computer program product comprising a computer-readable medium bearing computer program code embodied therein for use with a computer.

In another exemplary embodiment of the invention, there is an apparatus comprising: means for receiving from a network device, by a user equipment of a communication network, first information comprising configuration of time information (timeInfo) usage; means for receiving further information comprising time information (timeInfo) associated with at least one network device of the communication network; and means, based on the configuration of the time information usage and time information from the communication network, for deriving synchronized timing by the user equipment.

A further exemplary embodiment is an apparatus comprising the apparatus of the previous paragraph, wherein the at least one network device comprises more than one network device that share a common master clock with the user equipment, wherein the more than one network device belong to a same timing advance group, wherein the deriving comprises deriving the synchronized timing is based on whether or not the configuration of time usage information from the network device is to cause the user equipment to apply a propagation delay compensation, wherein the deriving synchronized timing is based on the time synchronization configuration from the network device related to the derivation of synchronized timing if the user equipment receives the time information from more than one network devices, wherein there is determining a time error associated with a difference between the derived synchronized timing and the timing of the network device from which the time information was received; and based on the determining, signaling the network device information regarding the time error, wherein the determining the time error is based on the difference exceeding a configured threshold.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 5A, FIG. 5B, and FIG. 5C each show a method in accordance with example embodiments of the invention which may be performed by an apparatus.

DETAILED DESCRIPTION

In example embodiments of the invention there is provided accurate clock synchronization to minimize the timing error across a group of UEs to support deterministic packet transfer service over the radio and to facilitate accurate application-level clock synchronization.

Example embodiments of the invention relate to improved time synchronization operations for improved communication operations across network devices. For Time synchronization all network devices that are participating in real-time communication should have a common understanding of time synchronicity requirements to achieve fault tolerance. This time synchronicity can include that a group of network devices adhere to the similar rules in selecting communication paths, reserving bandwidth and time slots, and for processing and forwarding communication packets An example embodiment of the invention target 5G or beyond systems that shall support industrial applications with strictly deterministic cyclic traffic and time synchronicity requirements.

Figures 1A, 1B:
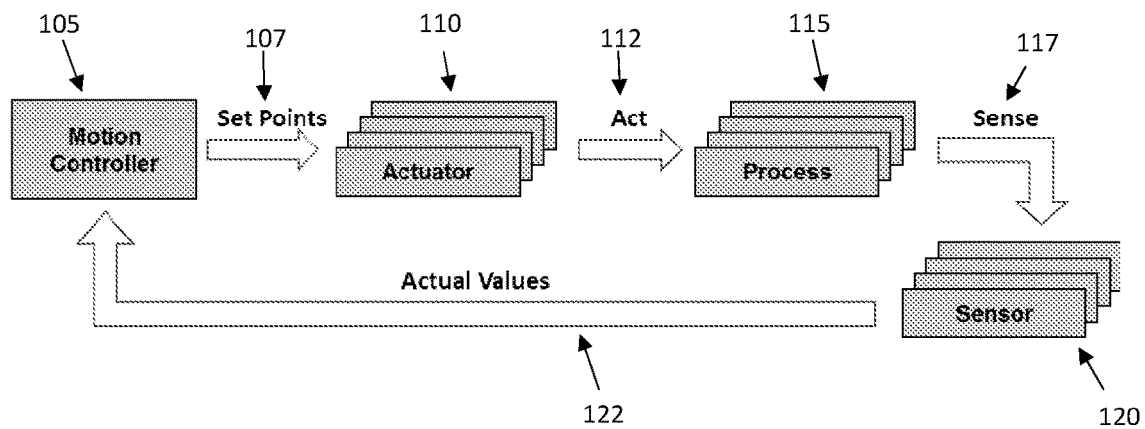
FIG. 1A shows Figure 5.3.2.1-1: Schematic representation of a motion control system of 3GPP TR 22.804 V16.0.0 (2018 June)
FIG. 1B shows Table 1: Typical characteristics of motion control systems for three major applications of 3GPP TR 22.804 V16.0.0 (2018 June)

FIG. 1A illustrates Figure 5.3.2.1-1: Schematic representation of a motion control system of 3GPP TR 22.804 V16.0.0 (2018 June). FIG. 1A shows a schematic representation of a motion control system. As shown in FIG. 1A there are elements semantic labeling of technical characteristics of motion-control use cases which can benefit with operations in accordance with example embodiments of the invention. For instance, for motion control of moving and/or rotating parts of printing/packaging machines, the 5G system shall support a very high synchronicity between a communication group of 50-100 UEs in the order of 1 µs or below.

In accordance with section 5.3.2.1 of 3GPP TR 22.804 motion control is among the most challenging and demanding closed-loop control applications in industry. A motion control system is responsible for controlling moving and/or rotating parts of machines in a well-defined manner, for example in printing machines, machine tools or packaging machines. Due to the movements/rotations of components, wireless communications based on powerful 5G systems constitutes a promising approach. On the one hand this is because with wirelessly connected devices, slip rings, cable carriers, etc., which are typically used for these applications today—can be avoided, thus reducing abrasion, maintenance effort and costs. On the other hand, this is because machines and production lines may be built with less restrictions, allowing for novel (and potentially much more compact and modular) setups.

In the schematic representation of a motion control system as depicted in FIG. 1A. A motion controller 105 periodically sends desired set points 107 to one or several actuators 110 (e.g., a linear actuator or a servo drive) which thereupon perform a corresponding action on one or several processes or actions (Act 112), in this case usually a movement or rotation of a certain component. At the same time, sensors (Sensor 120) sense (Sense 117) the current state of the process(es) 115, in this case for example the current position and/or rotation of one or multiple components. The actual values 122 are sent back to the motion controller 105. This is done in a strictly cyclic and deterministic manner, such that during one communication cycle time $T_{cycle}$ the motion controller sends updated set points to all actuators, and all sensors send their actual values back to the motion controller. Nowadays, typically Industrial Ethernet technologies are used for motion control systems.

In the motion control example illustrated in FIG. 1A, the actuation shall be triggered synchronously across the group of actuators/UEs with the timing error in the order of 1 µs. The same applies to sensing. Another use case with similar requirements is Smart Grid fault protection, where Phasor Measurement Units (PMUs) in different sub-stations of the grid need to synchronously perform phasor measurement in order to detect faults. It is therefore required that 5G system delivers highly accurate clock information to a group of UEs.

FIG. 1B shows Table 1: Typical characteristics of motion control systems for three major applications, of 3GPP TR 22.804 V16.0.0 (2018 June). FIG. 1B shows some typical values for the number of nodes, cycle times and payload sizes for some of the most important application areas of motion control systems. However, it has been noted that these values may vary widely in practice and that not all sensors and/or actuators in a motion control system may have to be connected using a 5G system. It is expected that there will be a seamless coexistence between Industrial Ethernet and the 5G system in the future.

One targeted scenario and working assumptions of the example embodiments of the invention include:

The group of DTEs of the same IAC application consists of $\{DTE_1, \ldots, DTE_N\}$. $DTE_i$ uses $UE_i$ to access 5G RAN through which it further connects to the industrial plant network (e.g. Industrial Ethernet, TSN);

The group of UEs $\{UE_1, \ldots, UE_N\}$ is locally distributed within one or more neighboring base stations $\{BS_1, \ldots, BS_M\}$;

Base station $BS_i$ consists of a single central unit ($BBU_i$) and one or multiple distributed units $\{RU_{i,1}, \ldots, RU_{i,K}\}$ connected to the $BBU_i$ via fronthaul;

RUs of $BS_i$ are synchronized to the master clock of $BS_i$, where the master clock of $BS_i$ is the internal clock of $BBU_i$ or an external clock (e.g., clock of a fronthaul switch). Each master clock can be traced back to the Primary Reference Time Clock (PRTC), e.g. GPS clock;

$UE_i$ may be served by multi-connectivity and/or carrier aggregation of multiple RUs, where those RUs are connected to serving BSs in $\{BS^{i,1}, \ldots, BS^{i,Q}\}$, where $Q \geq 1$. Each of those serving BSs maintains cell-specific timing advance (TA) values for $UE_i$ or cells with the same timing advance and the same downlink timing reference cell may compose a Timing Advance Group (TAG) and UEi may belong to two TAGs; and The clock of $UE_i$ is synchronized to the master clock of $BS^{i,s}$, where $BS^{i,s}$ is one of the serving BSs from $\{BS^{i,1}, \ldots, BS^{i,Q}\}$. The synchronization is based on the time reference information (timeInfo) sent by $BBU^{i,s}$ via $RU^{i,s}$ using either broadcast System Information Block (SIB) or unicast RRC signalling. The clock of $UE_i$ may also be synchronized based on timeInfos sent by multiple BSes/BBUs if those BSes share a common master clock. To help on clock source selection, the accuracy of provided clock is indicated as a part of the timeInfo, with a GPS epoch. But accuracy may not exist with other epochs.

It is noted that the identifications in this application that use letters and/or numbers including a use of letter(s) and/or number(s) in a subscript or a superscript of an identifier can be interchangeable throughout the application without limiting the operations as claimed. Further, these letter(s) and/or number(s) can reference an integer and/or order of the operations for which they are used.

Figure 2:
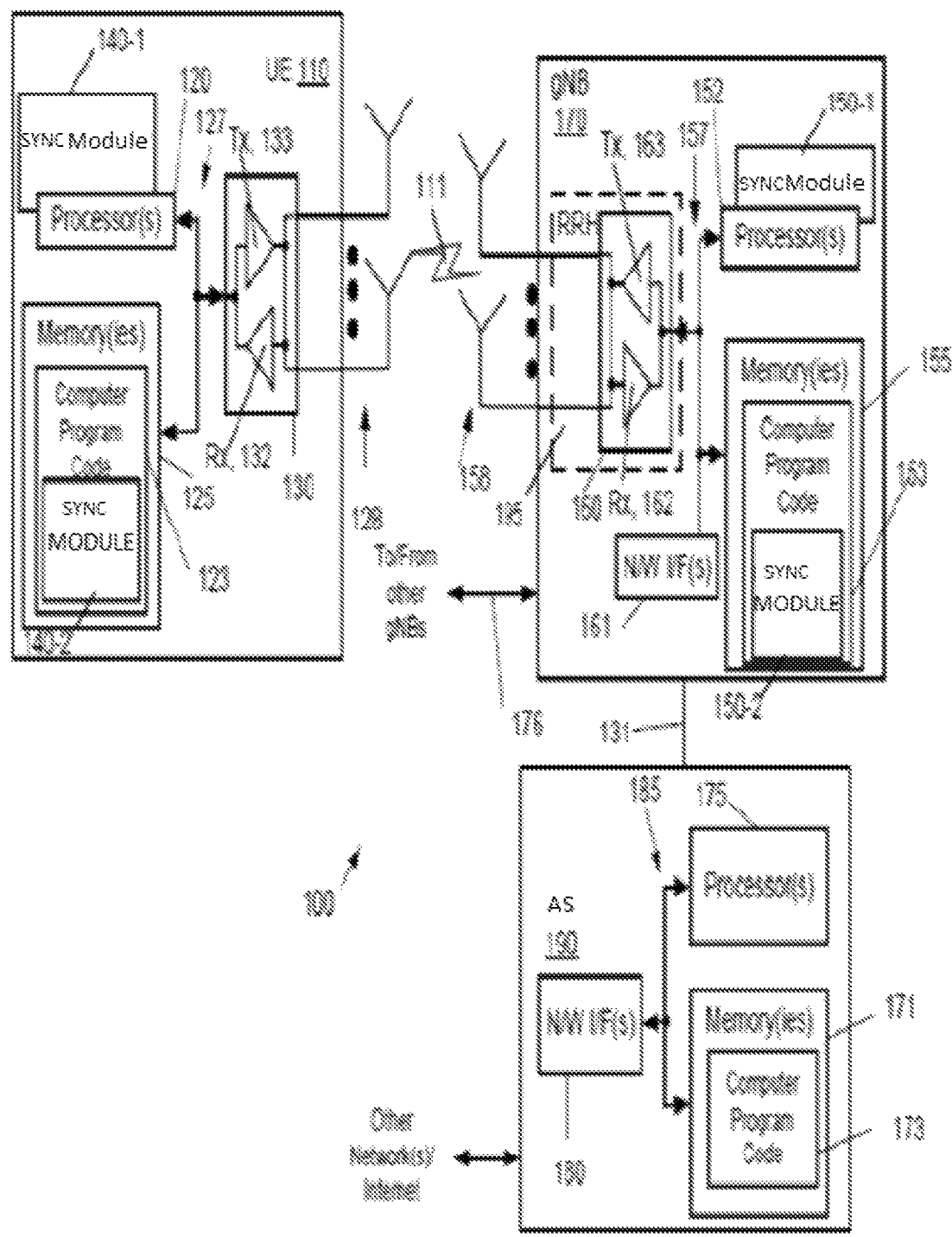
FIG. 2 shows a high level block diagram of various devices used in carrying out various aspects of the invention.

Before describing the example embodiments of the invention in further detail reference is made to FIG. 2. FIG. 2 shows a block diagram of one possible and non-limiting exemplary system in which the exemplary embodiments may be practiced. In FIG. 2, a user equipment (UE) 110 is in wireless communication with a wireless network 100. A UE is a wireless or wired device, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 can include a sync processor for user device (SYNC) module 140 which is configured to perform the example embodiments of the invention as described herein. The SYNC module 140 comprising one of or both parts 140-1 and/or 140-2, which may be implemented in a number of ways. The SYNC module 140 may be implemented in hardware as SYNC module 140-1, such as being implemented as part of the one or more processors 120. The SYNC module 140-1 may be implemented also as an integrated circuit or through other hardware such as a programmable gate array. In another example, the SYNC module 140 may be implemented as SYNC module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a synch processor for gNB (SYNC) module 150 which is configured to perform example embodiments of the invention at least related to timing synchronization as described herein. The SYNC module 150 comprising one of or both parts 150-1 and/or 150-2, which may be implemented in a number of ways. The SYNC module 150 may be implemented in hardware as SYNC module 150-1, such as being implemented as part of the one or more processors 152. The SYNC module 150-1 may be implemented also as an integrated circuit or through other hardware such as a programmable gate array. In another example, the SYNC module 150 may be implemented as SYNC module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 or Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 includes an AS 190. The AS 190 is an application function of a 3GPP entity such as of a 5G CN that interfaces with a server such as an IAC system or application server that communicates with devices such as the gNB 170 and UE 110 of FIG. 2. This AS 190 may be in the IAC service domain though it may be co-located with the gNB 170 (e.g., in order to provide low latency service). In accordance with example embodiments of the invention the AS 190 provides the service level synchronization related information (i.e., AS level context information) to gNBs such as the gNB 170. The AS 190 works with the gNB 170 to at least provide timing synchronization services to wireless devices such as the UE 110 and/or to the wireless network 100. The gNB 170 is coupled via a link 131 to the AS 190. The link 131 may be implemented as, e.g., an S1 or Nx interface. A connection between the AS 190 and the UE 110 may include a connection, such as a logical connection, which can be via link 131 of gNB 170 and which may include a partially wireless link e.g., wireless link 111 between UE 110 and gNB and a partially wireline network (e.g. IP or ethernet) from gNB to AS. The AS 190 includes one or more processors 175, one or more memories 171, and may or may not include one or more network interfaces (N/W I/F(s)) 180, interconnected through one or more buses 185. It is noted that the AS 190 may comprise wireless network interfaces and/or may instead use logical connections, in whole or in part, to the gNB 170 and/or the UE 110. The one or more memories 171 include computer program code 173. The one or more memories 171 and the computer program code 173 are configured, with the one or more processors 175, to cause the AS 190 to perform one or more timing synchronization operations in accordance with the example embodiments as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 120, and/or 175 and memories 155, 125, and/or 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, AS 190 and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In accordance with example embodiments of the invention solutions for time synchronization (e.g., radio level time synchronization) for the group of UEs may include at least one of the following mechanisms:

1) a mechanism to create and manage contextual information about the group of UEs at RAN or some information can from other network node from CN or application server, including the information about UE identities, UE locations, UE RRC states, list of BSs providing service to each UE, synchronization requirements for the group, etc.;

2) a mechanism to optimally select the base station $BS^{i,s}$ for each $UE_i$ in the IAC group, from which $UE_i$ will receive the timeInfo and to identify the closest common upstream clock (CCUC) for the selected base stations $\{BS^{1,s}, BS^{2,s}, \ldots, BS^{N,s}\}$. The "closest" means the closest common upstream clock in the clock tree hierarchy (not necessarily physically the closest);

3) a mechanism to distribute timeInfo from each selected $BS^{i,s}$ to the corresponding $UE_i$;

4) a mechanism to specify UE behavior upon reception of the time reference information including propagation delay compensation method, if needed; and 5) a mechanism to estimate the maximum time error within the group and trigger corrective actions in case it exceeds a threshold given by the synchronization requirements.

Some technical features in accordance with example embodiments of the invention may include:

group context management, as indicated in 1) above, includes mechanism to allow synchronization requirements to be negotiated with the IAC application (such as with the AS 190 as in FIG. 2) based on the synchronization performance offered by the RAN (such as with the network 100 as in FIG. 2).

Furthermore, it allows BS (such as the gNB 170 as in FIG. 2) selection mechanism, as indicated in 2) above, time reference distribution mechanism, as indicated in 3) above, and UE (such as UE 110 as in FIG. 2) behavior, as indicated in 4) above, to be optimized to meet the agreed service level;

with $BS^{i,s}$ is selected and corresponding CCUC identified, as indicated in 2) above, the upper bound on the relative time difference between any two UEs in the group is $max|TE(UE_i, UE_j)| \leq max|TE(UE_i, CCUC)| + max|TE(UE_j, CCUC)|$, where base stations $BS^{i,s}$ are selected to minimize $max|TE(UE_i, UE_j)|$ within the group. By using CCUC (instead of PRTC) as a common time synchronization reference for the group, a tighter bound may be achieved with a lower hardware cost;

group-optimized timeInfo time reference distribution, as indicated in 3) above, allows an UE (such as with the UE 110 as in FIG. 2) to receive the time reference information on a time-frequency resource that minimizes $max|TE(UE, CCUC)|$ under the given resource constraints. This optimization may include a combination of SIB-based signalling and dedicated RRC signalling, cell selection in case of CA/MC, time-alignment with TA command. Furthermore, it allows the distribution of UE-specific time reference e.g. in cases when propagation compensation shall be performed on the RAN side for some UEs;

UE behavior specification, as indicated in 4) above, allows certain characteristics of the UE group, such as processing capabilities, geographical distribution, mobility, and TA accuracy of the UEs to be reported to the RAN, centrally processed, and their impact on the synchronization accuracy properly mitigated e.g. by specifying a TA filtering mechanism or a propagation compensation scheme to be applied at the UE side and/or by specifying any manipulation that needs to be performed on the received time reference information in order to derive UE-specific clock information; and time error estimation and reporting, as indicated in 5) above, allows RAN to detect when synchronization requirements are violated and to either trigger reconfiguration of the synchronization mechanisms 2)-4) as indicated above to bring down the time error within the requirements, or trigger negotiation of new synchronization requirements with the IAC application.

In accordance with example embodiments of the invention, context information provided from a network, e.g., an IAC server, or from another network node or from CN or an application server, is mainly service related including UE identifier, timing synchronization requirements etc. On the network side, the context information may be further extended to include serving network/RAN related context such as RRC state, serving BSs, TAs etc.

Figure 3A:
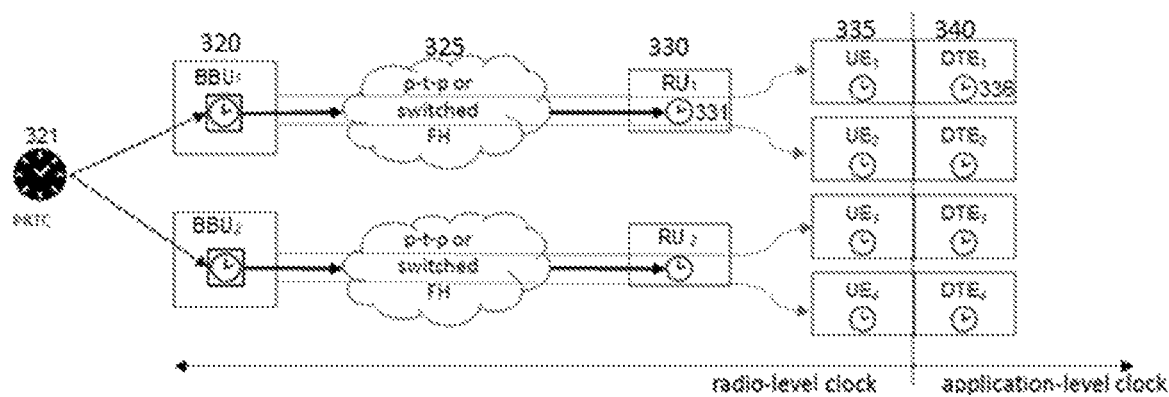
FIG. 3A shows a radio level clock synchronization scenario with internal master clock in the centralized units in accordance with example embodiments of the invention.
Figure 3B:
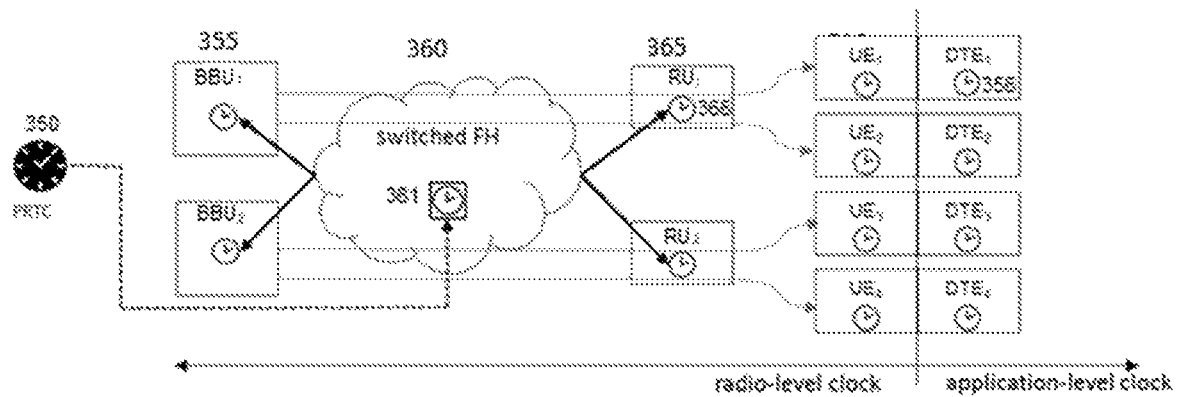
FIG. 3B shows a radio level clock synchronization scenario with external master clock in a switched fronthaul in accordance with example embodiments of the invention.

FIG. 3A and FIG. 3B each show a simple scenario in accordance with example embodiments of the invention where each $BS_i$ consists of a single $BBU_i$ and single $RU_i$ is illustrated in FIGS. 3A and 3B.

FIG. 3A shows a situation where the clock of $BBU_i$ is the master clock of $BS_i$.

In FIG. 3A, timeInfo destined to $UE_1$ is determined by $BBU_1$ 320 based on its clock, which can be traced back to PRTC 321. The timeInfo relates to the clock 321's time of an air interface event at $RU_1$ 330, such as the SFN boundary at or immediately after the ending boundary of the System Information window in which timeInfo is transmitted. The timing of the event is determined by the $RU_1$'s clock 331, which is synchronized to the clock 321. Based on the received timeInfo, $UE_1$ will synchronize its clock to clock 336. $UE_2$, which also receives timeInfo from $BBU_1$ 320 will follow the same method to synchronize its clock to clock 321. UE3, which receives clock nfo from $BBU_2$ will synchronize its clock to the clock of $BBU_2$, which can also be traced back to the same PRTC clock 321 as $BBU_1$ 320. $DTE_1$ connected to $UE_1$ may synchronize its clock to the clock of $UE_1$, potentially applying an offset between radio- and application-level clocks.

FIG. 3B shows a situation where the master clock of $BS_i$ is an external clock located in a fronthaul switch. The switched fronthaul may be a TSN, and the external clock may be a TSN clock.

In FIG. 3B, timeInfo destined to $UE_1$, 2, 3, or 4 is determined by $BBU_1$ 355 based on its clock, which is synchronized to a clock such as a clock 350 located in the fronthaul network (e.g. in an Ethernet or TSN switch). Clock 350 can be traced back to PRTC. TimeInfo relates to the clock 361's time of an air interface even at $RU_1$ 365, such as the SFN boundary at or immediately after the ending boundary of the System Information window in which timeInfo is transmitted. The timing of the event is determined by the $RU_1$'s clock 366, which is synchronized to the clock 361. Based on the received timeInfo, $UE_1$ will synchronize its clock to $DTE_1$ clock 356. $UE_2$, which also receives timeInfo from BBU1 355 will follow the same method to synchronize its clock. UE3, which receives clockInfo from BBU2 will synchronize its clock to the clock of BBU2, which is synchronized to the same clock 361. $DTE_1$ connected to $UE_1$ may synchronize its clock to the clock of $UE_1$, potentially applying an offset between radio- and application-level clocks. In FIG. 3B, timeInfo destined to $UE_{1, 2}$ is determined by BBU1 355 based on its clock 356, which is synchronized to a clock 361 located in the fronthaul network (e.g. in an Ethernet or TSN switch). Clock 361 can be traced back to PRTC clock 350. TimeInfo relates to the clock 356's time of an air interface even at RU1 365, such as the SFN boundary at or immediately after the ending boundary of the System Information window in which timeInfo is transmitted. The timing of the event is determined by the RU1's clock 366, which is synchronized to the clock 361. Based on the received timeInfo, $UE_1$ 370 will synchronize its clock 371 to clock 356. $UE_2$, which also receives timeInfo from $BBU_1$ 355 will follow the same method to synchronize its clock. UE3, which receives timeInfo from $BBU_2$ will synchronize its clock to the clock of $BBU_1$, which is synchronized to the same clock 361. $DTE_1$ connected to $UE_1$ may synchronize its clock to the clock of $UE_1$, potentially applying an offset between radio- and application-level clocks.

In one targeted scenario, example embodiments of the invention aims to minimize $\max|TE(UE_i, UE_j)|$ over all UE pairs in the UE group, where $TE(UE_i, UE_j)$ is the relative time error between clocks of $UE_i$ and $UE_j$. The time error $TE(UE_i, UE_j)$ is besides others factors caused by:

Time error $TE(BBU^{i,s}, BBU^{j,s})$ between $BBU^{i,s}$ from which $UE_i$ receives its timeInfo and $BBU^{j,s}$ from which $UE_j$ receives its timeInfo, unless if $UE_i$ and $UE_j$ receive the timeInfo from a common BBU. This error satisfies $|TE(BBU^{i,s}, BBU^{j,s})| \leq |TE(PRTC, BBU^{i,s})| + |TE(PRTC, BBU^{j,s})|$;

Time error $TE(BBU^{i,s}, RU^{i,s})$ between $BBU^{i,s}$ and $RU^{i,s}$ over which $UE_i$ receives its timeInfo and time error $TE(BBU^{j,s}, RU^{j,s})$ between $BBU^{j,s}$ and $RU^{j,s}$ over which $UE_j$ receives its timeInfo; and Propagation delay $TP(RU^{i,s}, UE_i)$ and propagation delay $TP(RU^{j,s}, UE_j)$, unless if timeInfo is compensated for propagation delay using timing advance TA for the cell in which UE receives the timeInfo.

Thus, example embodiments of the invention provides a solution to mitigate the above listed factors and minimize $\max|TE(UE_i, UE_j)|$ in order to meet the target clock synchronicity requirement for the group of UEs given by $\max|TE(UE_i, UE_j)| \leq \Delta$. The radio-clock synchronization may be used to facilitate application-level clock synchronization—the method for this is out of scope of the invention. Further, example embodiments of the invention provide for synchronization of IAC consisting of UEs.

In accordance with example embodiments of the invention there is:

1) Group Context Management

In order to better support the IAC services by RAN (such as gNB 170 and Network 100 as in FIG. 2), the tight interaction between IAC application server (AS) (such as AS 190 as in FIG. 2) and supporting communication system is assumed to allow the IAC AS to provide the service requirement including synchronization requirements and other UE group related information such as UE and UE group identifiers to the RAN. The negotiation procedure may also allow the RAN to provide the performance indicator such as the achievable synchronization accuracy (could be a range) to the IAC AS so that the IAC application may make corresponding adjustment to adapt to the achievable synchronization accuracy. Such negotiation procedures are referred to the Group context management procedures in FIG. 4 for the UE group of the IAC system served by the RAN. Additionally, an accurate application-level clock to perform these operations for the IAC group may be derived from a radio-level clock.

Based on the group context information provided from IAC AS well as each individual UE context (e.g., UE location, UE RRC state, the serving BSs, the TAs to each serving BS etc.) in the RAN, the group UE context is created and maintained in the BSs serving all the UEs in the group. The group UE context may be maintained in all the serving BSs in distributed way or maintained either in AMF or a central entity of managing the serving BSs (e.g., in the edge cloud controller).

2) BS Selection for timeInfo Distribution

The serving base stations $\{BS_1, \ldots, BS_M\}$ may coordinatively determine and select the relevant subset of base stations $\{BS^{1,s}, BS^{2,s}, \ldots, BS^{N,s}\}$ from which to distribute the time reference information (timeInfo) to the UE group $\{UE_1, \ldots, UE_N\}$. The selection could be done via a central entity e.g. edge cloud controller as well based on the available information. The determination and the selection of the distribution BSes is based on the group UE context. Example embodiments of the invention provide:

In one embodiment, one $BS(=BS^{1,s}=BS^{2,s}=, \ldots, =BS^{N,s})$ may be selected to distribute the timeInfo to all UEs in the group if at least one common BS can be found among all serving BSes of different UE. Then the timeInfo distribution signalling may be omitted from the rest of the serving BSes. This helps to save the signalling overhead of distributing timeInfo and also to avoid synchronization inaccuracy caused by time error $TE(BBU^{i,s}, BBU^{j,s})$;

In one embodiment, multiple BSes $\{BS^{1,s}, BS^{2,s}, \ldots, BS^{N,s}\}$ may be selected to distribute the timeInfo to the UE group. The selected BSes should cover all the UEs in the group at least. In addition, the selected BSes may be those that minimize the potential timing errors among the UEs in the group. For instance, the BSes $\{BS^{1,s}, BS^{2,s}, \ldots, BS^{N,s}\}$ that minimize max(TE($BBU^{i,s}, BBU^{j,s}$)) over all (i,j) pairs may be selected in order to minimize the potential time error caused by the reference timing difference/error between the selected BS nodes. In another instance, the $BS^{i,s}$ with minimum $TE(BBU^{i,s}, RU^{i,s})$ may be selected to minimize the potential timing error caused by the timing error between BBU and RU if the timing error can be measured or estimated. In another instance, the BSes $\{BS^{1,s}, BS^{2,s}, \ldots, BS^{N,s}\}$ with timing advances $\{TA^{1,s}, TA^{2,s}, \ldots, TA^{N,s}\}$ such that for all or most of BSes holds that $TA^{1,s} \approx TA^{2,s} \approx \ldots TA^{N,s}$ are selected to reduce the overhead of unnecessary TA compensation for more accurate synchronization. In another instance, BSes $\{BS^{1,s}, BS^{2,s}, \ldots, BS^{N,s}\}$ with timing advances $\{TA^{1,s}, TA^{2,s}, \ldots, TA^{N,s}\}$ such that the errors of those TAs w.r.t. to the RU-UE round-trip propagation time are minimized are selected to enable accurate propagation delay compensation. In another instance, BS selection may be based on a weighted sum of the above-mentioned metrics; and In one embodiment, multiple BSes sharing a common master clock may be selected to distribute timeInfo to a UE.

3) timeInfo Distribution

The timeInfo is distributed by the selected BSes $\{BS^{1,s}, BS^{2,s}, \ldots, BS^{N,s}\}$ using SIB broadcast and/or unicast control signalling such as RRC signalling. Combination of multicast signalling and unicast signalling is also possible. As in the prior art, timeInfo may carry GPS and/or UTC time of the ending boundary of SFN in which SIB/RRC signalling takes place, or other indicated SFN. Other time formats and reference points are not precluded. Example embodiments of the invention provide:

In one embodiment, a BS that generates timeInfo may use the knowledge of maximum time interval error (MTIE) characteristics of its clock to decide on the frequency of timeInfo signalling needed to meet the synchronization requirements of the UE group;

In one embodiment, a distributed BS that generates timeInfo may use the knowledge of MTIE characteristics of the clock of the timeInfo-generating unit (e.g., BBU) and MTIE characteristics of the clock of the air interface unit from which timeInfo is transmitted (e.g., RU) to decide on the frequency of timeInfo signalling needed to meet the synchronization requirements of the UE group;

In one embodiment, timeInfo signalling may use a combination of SIB broadcast and RRC unicast signalling optimized in a way to meet the minimum required signalling frequency with a minimum use of resources; and In one embodiment, the timing of timeInfo signalling can be optimized to ensure high TA accuracy based on which UE may compensate the timeInfo for propagation delay. For example, timeInfo signalling may be optimized to closely coincide with the transmission of TA command.

4) UE Behavior Specification

The selected BSes may then determine either independently or coordinatively on the configuration of distributed timeInfo usage by the UEs. Example embodiments of the invention provide:

In one embodiment, selected $BS^{i,s}$ may configure $UE_i$ not to apply any propagation delay compensation based on TA if $|TA^{i,s} - TA^{avg}|$, where $TA^{avg}$ is average over $\{TA^{1,s}, TA^{2,s}, \ldots, TA^{N,s}\}$, is so small that the synchronization within required accuracy among the UE groups can be achieved even though the acquired clock time by the UEs is not fully aligned with the clock time in RAN node due to propagation delay. One example of such scenario is local factory floor where all UEs can be quite close to each other and close to the selected BSes;

In one embodiment, the first subset UEs may be configured not to apply any time compensation due to similar TAs, while the second subset of UEs apply time compensation based on TA. Then selected BSes may compensate the TA difference/offset when distributing the timeInfo to the first subset of UEs to guarantee the UE group are synchronized within required accuracy regardless whether UE is configured to apply TA based compensation or not;

In one embodiment, the timeInfo distribution configuration may be exchanged over inter-BS interface. The exchanged information may include the TA compensation configuration and the TA offset between the UEs in different BSes. For instance, both $BS_i \in \{BS^{1,s}, BS^{2,s}, \ldots, BS^{N,s}\}$ and $BS_j \in \{BS^{1,s}, BS^{2,s}, \ldots, BS^{N,s}\}$ may determine that receiving UEs shall not compensate timeInfo based on their TAs since UEs that receive timeInfo from $BS_i$ have the same $TA_i$ and UEs that receive timeInfo from $BS_j$ have the same $TA_j$. However, in case of $TA_i \neq TA_j$, in order to synchronize the timing between the two sub-groups of UEs served by $BS_i$ and $BS_j$, one or both BSes may compensate for the $|TA_i - TA_j|$ difference in the distributed timeInfo to synchronize the whole UE group; and In one embodiment, the selected BSes $\{BS^{1,s}, BS^{2,s}, \ldots, BS^{N,s}\}$ may jointly decide on the TA filtering/averaging parameters to be used by the UEs of the IAC group for the purpose of TA-based propagation delay compensation, if such compensation is needed.

Based on timeInfo usage configuration (e.g., whether TA based time compensation should be performed or not and how TA shall be filtered/averaged over time for that purpose), UE derives the synchronization timing from received timeInfo. In this regards, example embodiments of the invention include:

In one embodiment, if a UE is receiving timeInfos from multiple BSes that share a common master clock, UE may be configured to use only timeInfo from a BS that configures the UE not to apply TA based propagation delay compensation; and In one embodiment, if a UE is receiving timeInfos from multiple BSes that share a common master clock and belong preferably to the same TAG, the UE may derive its clock from the both received timeInfos using the configured operation (e.g., by averaging them).

In one embodiment, if a UE is receiving timeInfos from multiple BSes that share a common master clock, the UE may be configured to report the time error to gNB if the difference between the derived clock from multiple received timeInfos is larger than the configured threshold.

5) Time Error Estimation in the Group of UEs

A selected $BS^{i,s}$ may be configured to estimate the maximum timing error max|TE($UE_i$, CCUC)|, where CCUC is the closest common upstream clock for all $BBU^{i,s}$ clocks (if all $BBU^{i,s}$ clock have a common master clock, than this master clock is the CCUC), based on e.g., max. time error of $BBU^{i,s}$ clock w.r.t. its master clock, time error max|TE ($BBU^{i,s}$, $RU^{i,s}$|), and the accuracy of $TA^{i,s}$ based on which $UE_i$ compensates timeInfo, If a UE receives timeInfos from multiple BSes, either of those may be configured to provide such estimate. All selected BSes $\{BS^{1,s}, BS^{2,s}, \ldots, BS^{N,s}\}$ may be configured to jointly estimate the maximum time error within the group of UEs and to report that error to IAC AS. The error is estimated as max(max|TE($UE_i,UE_j$)|) over all (i,j) pairs in the UE group, where max|TE($UE_i,UE_j$) |=max|TE($UE_i$, CCUC)|+max|TE($UE_j$, CCUC)|. If the maximum time error within the group of UEs is larger than configured threshold/synchronization accuracy given by the group context, different actions can be triggered:

- In one embodiment, new synchronization accuracy requirements can be negotiated with IAC AS;
- In one embodiment, new BS selection can be performed to further reduce the number of BSes selected to distribute timeInfo for example by applying various techniques such as beam forming to extend the coverage of timeInfo transmitted from BSes; and
- In one embodiment, the timeInfo distribution parameters may be changed to reduce the maximum time error within the group of UEs possibly at the cost of using more resources, e.g., by increasing the frequency of timeInfo.

Figure 4:
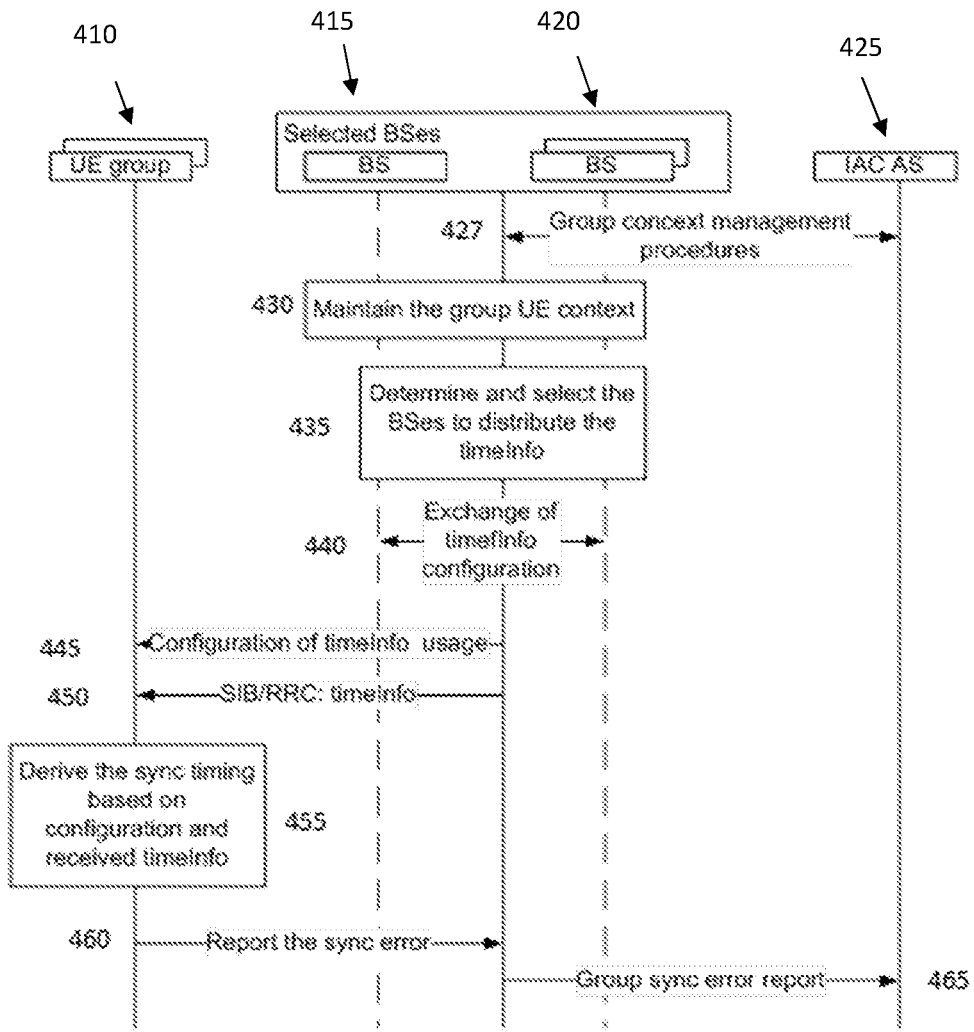
FIG. 4 shows operations of radio level clock synchronization in accordance with example embodiments of the invention.

FIG. 4 shows signalling operations in accordance with an example embodiment of the invention. As shown in FIG. 4 there is a UE group 410, a base station group BS group 420 that serves at least one UE in the UE group. The base stations (BSes) 415 within the BS 420 group are selected to transmit timeinfo such as to an IAC AS 425. At step 427 of FIG. 4 there are group context management procedures for determining timeinfo including communication of group context information between the IAC AS 425 and the BS group 420 and/or the selected BSes 415. This group context management includes allowing synchronization requirements to be negotiated with an IAC application of the IAC AS 425 based on the synchronization performance offered by the network associated with the base stations of the BS group 420 and/or the selected BSes 415. Furthermore, it allows BS selection, time reference distribution, and UE behavior 4) to be optimized to meet UE requirements such as an agreed service level, for each UE of a group of UE. At step 430 of FIG. 4 there are operations by the BS group 420 including the BSes 415 to maintain the group UE context. Then at step 435 there is determining and selecting the BSes 415 to distribute the timeinfo with the selected BSes 415 and corresponding CCUC identified by an upper bound on the relative time error between any two UEs in the group. At step 440 there is exchanging a timeinfo configuration 440 between the relevant BSs in the BS group 420 and the selected BSes 415 of the BS group 420. After this stage configuration of timeinfo usage 445 and SIB/RRC timeinfo 450 is communicated with the UE group 410. This configuration of timeinfo 445 is relate to UE group-optimized timeInfo distribution to allows UE of the group to receive the time reference information on a time-frequency resource that minimizes max|TE(UE, CCUC)| under the given resource constraints. This optimization may include a combination of SIB-based and dedicated RRC signalizing, cell selection in case of CA/MC to receive timeInfo, combination of timeInfo received from multiple selected cells, whether time-alignment with TA command should be used for timing error compensation or not, etc. The UE group 410 can then derive the synch timing based on configuration and received timeinfo 455. Then at step 460 the UE group 410 reports the synch error 460 or time error to the selected BSes 415 and/or the BS group 420. This information is then sent towards the IAC AS 425. This reporting can allow the selected BSes 415 to detect when synchronization requirements are violated and to either trigger re-configuration of the synchronization mechanisms to bring the synch error 460 or time error within certain requirements, and/or trigger negotiation of new synchronization requirements with the IAC AS 425.

Figure 5C:
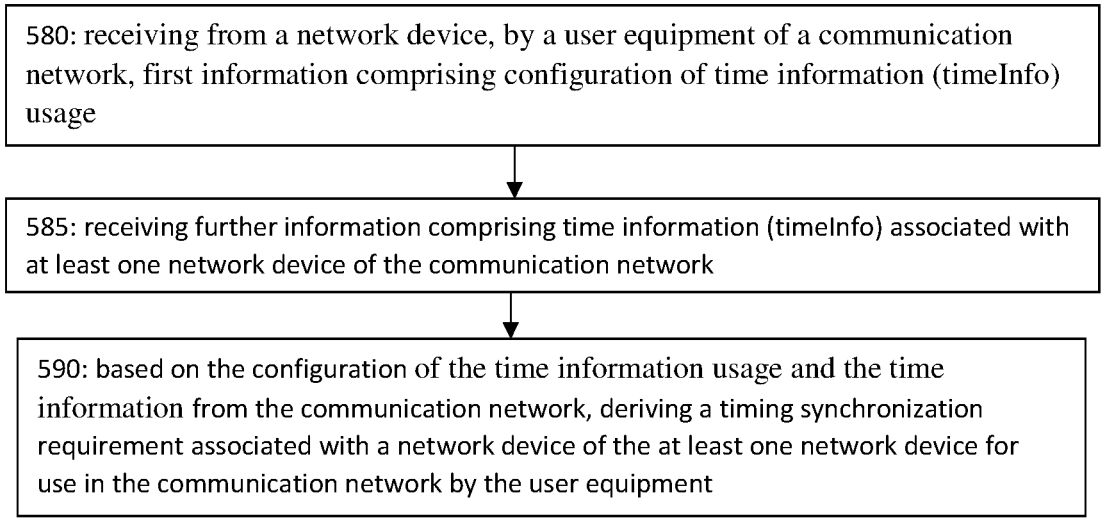

FIG. 5A, FIGS. 5B, and 5C each show a method in accordance with example embodiments of the invention which may be performed by an apparatus.

FIG. 5A illustrates operations which may be performed by a network node such as, but not limited to, a network node such as AS 190 as in FIG. 2 or an application function such as associated with an IAC system server. As shown in step 510 of FIG. 5A there is determining, by a network node, context information of a group of more than one user equipment, wherein the context information is based on at least service related information associated with the more than one user equipment; at step 520 of FIG. 5A there is sending information comprising the context information towards at least one base station of a communication network; and at step 530 of FIG. 5A there is based on the context information, negotiating with the at least one base station timing synchronization requirements for time information distribution to each user equipment of the group.

In accordance with the example embodiments as described in the paragraph above, wherein the context information comprises user equipment identifiers, and timing synchronization requirements for each user equipment of the group.

In accordance with the example embodiments as described in the paragraphs above, wherein the negotiating is using serving context information associated with the communication network comprising information of a radio resource control state, at least one serving base station, and timing advance information associated with each user equipment of the group.

In accordance with the example embodiments as described in the paragraphs above, wherein the server context information associated with the communication network comprises a list of base stations providing service to each of the more than one user equipment, and timing synchronization requirements associated with each of the more than one user equipment of the group.

In accordance with the example embodiments as described in the paragraphs above, wherein each base station of the list maintains cell-specific timing advance values for at least one user equipment of the group of more than one user equipment.

In accordance with the example embodiments as described in the paragraphs above, wherein the negotiating is based on a synchronization performance offered by the communication network.

In accordance with the example embodiments as described in the paragraphs above, wherein the determining the context information is based on at least performance indications received from each of the at least one base station.

In accordance with the example embodiments as described in the paragraphs above, wherein the at least one base station comprises more than one base station selected to minimize timing errors.

In accordance with the example embodiments as described in the paragraphs above, wherein the network node is embodied in an industrial automation and control system server.

A non-transitory computer-readable medium (Memory(ies) 171 of FIG. 2) storing program code (Computer Program Code 173 of FIG. 2), the program code executed by at least one processor (Processor(s) 175 of FIG. 2) to perform the operations as at least described in the paragraphs above.

In accordance with an example embodiment of the invention as described above there is an apparatus comprising: means for determining (Memory(ies) 171, Computer Program Code 173, and Processor(s) 175 of FIG. 2) by a network node (AS 190 of FIG. 2), context information of a group of more than one user equipment, wherein the context information is based on at least service related information associated with the more than one user equipment; means for sending (Link 131, and/or N/W I/F(s) 180 as in FIG. 2) information comprising the context information towards at least one base station of a communication network; and means, based on the context information, for negotiating (Memory(ies) 171, Computer Program Code 173, Processor(s) and 175 Link 131, and/or N/W I/F(s) 180 as in FIG. 2) with the at least one base station (gNb 170 as in FIG. 2) timing synchronization requirements for distribution to each user equipment of the group.

In the example aspect of the invention according to the paragraph above, wherein at least the means for determining, sending, and negotiating comprises a non-transitory computer readable medium [Memory(ies) 171 as in FIG. 2] encoded with a computer program [, Computer Program Code 173 as in FIG. 2] executable by at least one processor [Processor(s) 175 as in FIG. 2].

FIG. 5B illustrates operations which may be performed by a network node such as, but not limited to, a network device such as the gNB 170 as in FIG. 2 or an eNB. As shown in step 550 of FIG. 5B there is receiving from a network node, by a network device of a communication network, information comprising context information associated with a group of more than one user equipment, wherein the context information is based on at least service related information associated with the more than one user equipment; as shown in step 560 of FIG. 5B there is, based on the information, negotiating with the network node timing synchronization requirements for distribution to each user equipment of the group; as shown in FIG. 570 of FIG. 5B there is, in response to the negotiating, selecting at least one network device of the communication network for the distribution of time information to each user equipment of the group of more than one user equipment; and as shown in step 575 of FIG. 5B there is configuring time information usage at least one user equipment of the group of more than one user equipment.

In accordance with the example embodiments as described in the paragraph above, wherein the network device comprises a serving base station, and wherein the at least one network device of the communication network is selected by the serving base station based on at least the context information.

In accordance with the example embodiments as described in the paragraphs above, wherein the context information comprises user equipment identifiers, and timing synchronization requirements for each user equipment of the group.

In accordance with the example embodiments as described in the paragraphs above, wherein the negotiating is using serving context information associated with the communication network comprising information of a radio resource control state, at least one serving base station, and timing advance information associated with each user equipment of the group.

In accordance with the example embodiments as described in the paragraphs above, wherein the serving context information comprises a list of network devices providing service to each of the more than one user equipment.

In accordance with the example embodiments as described in the paragraphs above, wherein the selecting the at least one network device is based on the list of network devices comprising at least one common network device for the group of more than one user equipment.

In accordance with the example embodiments as described in the paragraphs above, wherein the selecting the at least one network device is based on the at least one network device sharing a common master clock or belonging to a same timing advance group.

In accordance with the example embodiments as described in the paragraphs above, wherein the at least one network device uses error characteristics associated with its common master clock to determine a frequency of the time information distribution to meet synchronization requirements of the more than one user equipment.

In accordance with the example embodiments as described in the paragraphs above, wherein the distribution of the timing synchronization requirements to each user equipment of the group is performed using at least one of broadcast and unicast signalling.

In accordance with the example embodiments as described in the paragraphs above, wherein the distribution of the time information comprises information of a closest common upstream clock associated with each of the at least one base station.

In accordance with the example embodiments as described in the paragraphs above, wherein the determining the context information is based on at least one of: negotiating synchronization requirements with the IAC service; and performance indications received from each of the at least one network device.

In accordance with the example embodiments as described in the paragraphs above, wherein the negotiating is based on a synchronization performance offered by the communication network.

In accordance with the example embodiments as described in the paragraphs above, wherein the distribution of the time information is performed on a time-frequency resource that minimizes a timing error for each user equipment of the group.

In accordance with the example embodiments as described in the paragraphs above, wherein the configuration of time information usage causes at least one user equipment of the group of more than one user equipment to not apply a propagation delay compensation based on a timing advance average.

In accordance with the example embodiments as described in the paragraphs above, wherein the configuration of time information usage causes: a first subset of at least one user equipment of the group of more than one user equipment to not apply a time compensation based on a timing advance average; and a second subset of at least one user equipment of the group of more than one user equipment to apply a time compensation based on a timing advance average.

In accordance with the example embodiments as described in the paragraphs above, wherein the at least one network device compensates for timing advance average differences to synchronize the timing between each user equipment of the group of more than one user equipment.

A non-transitory computer-readable medium (Memory(ies) 155 of FIG. 2) storing program code (Computer Program Code 153 and/or SYNC Module 150-2 of FIG. 2), the program code executed by at least one processor (Processor(s) 152 and/or SYNC Module 150-1 of FIG. 2) to perform the operations as at least described in the paragraphs above.

In accordance with an example embodiment of the invention as described above there is an apparatus comprising: means for receiving (link 131 and/or N/W I/F(s) 161 as in FIG. 2) from a network node (AS 190 as in FIG. 2), by a network device (gNB 170 as in FIG. 2) of a communication network (network 100 as in FIG. 2), information comprising context information associated with a group of more than one user equipment (e.g., UE 110 as in FIG. 2), wherein the context information is based on at least service related information associated with the more than one user equipment; means, based on the information, for negotiating (Memory(ies) 155, Computer Program Code 153 and/or SYNC Module 150-2, Processor(s) 152 and/or SYNC Module 150-1, and link 131 and/or N/W I/F(s) 161 of FIG. 2) with the network node timing synchronization requirements for distribution to each user equipment of the group; and means, in response to the negotiating, for selecting (Memory(ies) 155, Computer Program Code 153 and/or SYNC Module 150-2, Processor(s) 152 and/or SYNC Module 150-1, and link 131 and/or N/W I/F(s) 161 of FIG. 2) at least one network device of the communication network for the distribution by the at least one network device of the timing synchronization requirements to each user equipment of the group of more than one user equipment In the example aspect of the invention according to the paragraph above, wherein at least the means for receiving, negotiating, and selecting comprises a non-transitory computer readable medium [Memory(ies) 155 as in FIG. 2] encoded with a computer program [,Computer Program Code 153 and/or SYNC Module 150-2 as in FIG. 2] executable by at least one processor [Processor(s) 152 and/or SYNC Module 150-1 as in FIG. 2].

FIG. 5C illustrates operations which may be performed by a mobile device such as, but not limited to, a user equipment such as the UE 110 as in FIG. 2 or a UE. As shown in step 580 of FIG. 5C there is receiving from a network device, by a user equipment of a communication network, first information comprising configuration of time information (timeInfo) usage; as shown in step 585 of FIG. 5C there is receiving further information comprising time information (timeInfo) associated with at least one network device of the communication network; and as shown in step 590 of FIG. 5C there is based on the configuration of the time information usage and the time information from the communication network, deriving a timing synchronization requirement associated with a network device of the at least one network device for use in the communication network by the user equipment.

In accordance with the example embodiments as described in the paragraph above, wherein the at least one network device comprises more than one network device that share a common master clock with the user equipment.

In accordance with the example embodiments as described in the paragraph above, wherein the more than one network device belong to a same timing advance group.

In accordance with the example embodiments as described in the paragraph above, wherein the deriving comprises deriving the timing synchronization requirement associated with the at least one network device based on whether or not the time synchronization configuration from the network device is to cause the user equipment to apply a propagation delay compensation.

In accordance with the example embodiments as described in the paragraph above, wherein the deriving comprises deriving the timing synchronization requirement associated with the at least one network device based on the time synchronization configuration from the network device related to use the configured operation to derive the timing synchronization requirement associated with more than one network devices if the user equipment receives the timing synchronization requirement from more than one network devices.

In accordance with the example embodiments as described in the paragraph above, wherein there is determining a time error associated with a difference between the timing synchronization requirement and the timing synchronization requirement associated with each of more than one network device of the communication network; and based on the determining, signaling the network device information regarding the time error.

In accordance with the example embodiments as described in the paragraph above, wherein the determining the time error is based on the difference exceeding a configured threshold.

A non-transitory computer-readable medium (Memory(ies) 125 of FIG. 2) storing program code (Computer Program Code 123 and/or SYNC Module 140-2 of FIG. 2), the program code executed by at least one processor (Processor(s) 120 and/or SYNC Module 140-1 of FIG. 2) to perform the operations as at least described in the paragraphs above.

In accordance with an example embodiment of the invention as described above there is an apparatus comprising: means for receiving (link 111 and/or one or more transceivers 130 as in FIG. 2) from a network device (gNB 170 and/or AS 190 as in FIG. 2), by a user equipment (UE 110 as in FIG. 2) of a communication network (network 100 as FIG. 2), first information comprising a time synchronization configuration from the communication network; receiving (link 111 and/or one or more transceivers 130 as in FIG. 2) further information comprising a timing synchronization requirement associated with at least one network device of the communication network; and based on the time synchronization configuration from the communication network, deriving (Memory(ies) 125, Computer Program Code 123 and/or SYNC Module 140-2, Processor(s) 120 and/or SYNC Module 140-1, and link 111 and/or one or more transceivers 130 as in FIG. 2) a timing synchronization requirement associated with a network device of the at least one network device for use in the communication network by the user equipment.

In the example aspect of the invention according to the paragraph above, wherein at least the means for receiving and deriving comprises a non-transitory computer readable medium [Memory(ies) 125 as in FIG. 2] encoded with a computer program [Computer Program Code 123 and/or SYNC Module 140-2 as in FIG. 2] executable by at least one processor [Processor(s) 120 and/or SYNC Module 140-1 as in FIG. 2].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
at least one processor; and
at least one memory comprising computer program code,
the at least one memory and computer program code configured, with the at least one processor, to cause the apparatus at least to
receive from a network node, by the apparatus of a communication network, information comprising context information associated with a group of more than one user equipment, wherein the context information is based on at least service related information associated with the more than one user equipment;
based on the context information, negotiate with the network node timing synchronization requirements for time information distribution to each user equipment of the group;
in response to the negotiating, select multiple network devices of the communication network for the distribution of time information (timeInfo) to each user equipment of the group of more than one user equipment; and
configure time information usage for at least one user equipment of the group of more than one user equipment, wherein the time information is to minimize the timing error across the group of more than one user equipment,
wherein the selecting of the multiple network devices is based on the network devices sharing a common master clock,
wherein the at least one memory and computer program code are further configured, with the at least one processor, to cause the apparatus at least to
generate timeInfo, by at least one network device, using knowledge of maximum time interval error (MTIE) characteristics of its clock to decide on a frequency of timeInfo signalling needed to meet synchronization requirements of the user equipment group;
wherein the at least one network device that generates timeInfo uses the knowledge of MTIE characteristics of the clock of a timeInfo-generating unit and MTIE characteristics of the clock of the air interface unit from which timeInfo is transmitted to decide on the frequency of timeInfo signalling needed to meet the synchronization requirements of the user equipment group.

2. The apparatus according to claim 1, wherein when negotiating, the at least one memory and computer program code configured, with the at least one processor, to cause the apparatus at least to use serving context information associated with the communication network comprising information of a radio resource control state, at least one serving base station, and timing advance information associated with each user equipment of the group, and, wherein the serving context information comprises a list of network devices providing service to each of the more than one user equipment.

3. The apparatus according to claim 2, wherein the negotiating comprises providing performance indicator to the network node and is based on a synchronization performance offered by the communication network.

4. The apparatus according to claim 3, wherein
the timeInfo signalling uses a combination of SIB broadcast and RRC unicast signalling optimized to meet a minimum required signalling frequency with a minimum use of resources; and a timing of timeInfo signalling is optimized to ensure high timing advance accuracy based on which user equipment may compensate the timeInfo for propagation delay.

5. The apparatus according to claim 1, wherein the configuration of time information usage causes at least one user equipment of the group of more than one user equipment to not apply a propagation delay compensation based on a timing advance average.

6. The apparatus according to claim 1, wherein the configuration of time information usage causes: a first subset of at least one user equipment of the group of more than one user equipment to not apply a time compensation based on a timing advance average; and a second subset of at least one user equipment of the group of more than one user equipment to apply a time compensation based on a timing advance average.

7. A method, comprising:
receiving from a network device, by a user equipment of a group of more than one user equipment of a communication network, first information comprising configuration of time information (timeInfo) usage;
receiving further information comprising a timeInfo associated with at least one network device of the communication network; and
based on the configuration of the timeInfo usage and timeInfo from the communication network, deriving synchronized timing by the user equipment, wherein the time information is to minimize the timing error across the group of more than one user equipment,
wherein the at least one network device comprises more than one network device that share a common master clock with the user equipment,
wherein the timeInfo was generated, by at least one network device, using knowledge of maximum time interval error (MTIE) characteristics of its clock to decide on a frequency of timeInfo signalling needed to meet synchronization requirements of the user equipment group,
wherein the at least one network device that generates timeInfo used the knowledge of MTIE characteristics of the clock of a timeInfo-generating unit and MTIE characteristics of the clock of the air interface unit from which timeInfo is transmitted to decide on the frequency of timeInfo signalling needed to meet the synchronization requirements of the user equipment group.

8. The method according to claim 7, wherein the at least one network device comprises more than one network device that belong to a same timing advance group.

9. The method according to claim 7, wherein the deriving synchronized timing is based on whether or not the configuration of time information usage from the network device is to cause the user equipment to apply a propagation delay compensation.

10. The method according to claim 7, wherein the deriving synchronized timing is based on the configuration of time information usage from the network device related to whether or not the user equipment is configured to derive the synchronized timing if the user equipment receives the timing information from more than one network devices.

11. The method according to claim 7, wherein the deriving synchronized timing is based on the configuration of time information usage from the network device related to the derivation of synchronized timing if the user equipment receives the time information from more than one network device.

12. The method according to claim 7, comprising:
determining a time error associated with a difference between the derived synchronized timing and the timing of the network device of the communication network from which the time information was received; and
based on the determining, signaling the network device information regarding the time error,
wherein the time error is signaled if the difference exceeds a configured threshold.

13. The method according to claim 12, comprising:
the user equipment receiving timeInfos from multiple network devices that share a common master clock, the user equipment being configured to use only timeInfo from a network device that configures the user equipment not to apply timing advance based propagation delay compensation;
the user equipment deriving its clock from both received timeInfos using the configured operation by averaging them;
wherein the user equipment is configured to report the time error to a network node if the difference between the derived clock from multiple received timeInfos is larger than the configured threshold.

14. An apparatus, comprising:
at least one processor; and
at least one memory comprising computer program code, the at least one memory and computer program code configured, with the at least one processor, to cause the apparatus at least to
receive from a network device, by a user equipment of a group of more than one user equipment of a communication network, first information comprising configuration of time information usage;
receive further information comprising a time information associated with at least one network device of the communication network; and
based on the configuration of the time information usage and time information from the communication network, derive synchronized timing by the user equipment, w herein the time information is to minimize the timing error across the group of more than one user equipment,
wherein the at least one network device comprises more than one network device that share a common master clock with the user equipment,
wherein the timeInfo was generated, by at least one network device, using knowledge of maximum time interval error (MTIE) characteristics of its clock to decide on a frequency of timeInfo signalling needed to meet synchronization requirements of the user equipment group,
wherein the at least one network device that generates timeInfo used the knowledge of MTIE characteristics of the clock of a timeInfo-generating unit and MTIE characteristics of the clock of the air interface unit from which timeInfo is transmitted to decide on the frequency of timeInfo signalling needed to meet the synchronization requirements of the user equipment group.

15. The apparatus according to claim 14, wherein the at least one network device comprises more than one network device that belong to a same timing advance group.

16. The apparatus according to claim 14, wherein when deriving, the at least one memory and computer program code configured, with the at least one processor, to cause the apparatus at least to derive the synchronized timing based on whether or not the configuration of time information usage from the network device is to cause the user equipment to apply a propagation delay compensation.

17. The apparatus according to claim 14, wherein when deriving, the at least one memory and computer program code configured, with the at least one processor, to cause the apparatus at least to derive the synchronized timing based on the configuration of time information usage from the network device related to whether or not the user equipment is configured to derive the synchronized timing if the user equipment receives the time information from more than one network devices.

18. The apparatus according to claim 14, wherein the at least one memory and computer program code configured, with the at least one processor, to cause the apparatus at least to:
  determine a time error associated with a difference between the derived synchronized timing and the timing of the network device of the communication network from which the time information was received; and
  based on the determining, signal the network device information regarding the time error,
wherein the determining the time error is based on the difference exceeding a configured threshold.

19. The apparatus according to claim 18,
wherein the at least one memory and computer program code configured, with the at least one processor, to cause the apparatus at least to:
  receive, by the user equipment, timeInfos from multiple network devices that share a common master clock, the user equipment being configured to use only timeInfo from a network device that configures the user equipment not to apply timing advance based propagation delay compensation;
  the user equipment deriving its clock from both received timeInfos using the configured operation by averaging them,
wherein the user equipment is configured to report the time error to a node if the difference between the derived clock from multiple received timeInfos is larger than the configured threshold.

* * * * *